No. 740,537. PATENTED OCT. 6, 1903.
C. H. COCHRANE.
TYPE SPACE AND MEANS COÖPERATING THEREWITH FOR JUSTIFYING
LINES OF TYPE.
APPLICATION FILED FEB. 1, 1900.
NO MODEL. 2 SHEETS—SHEET 1.
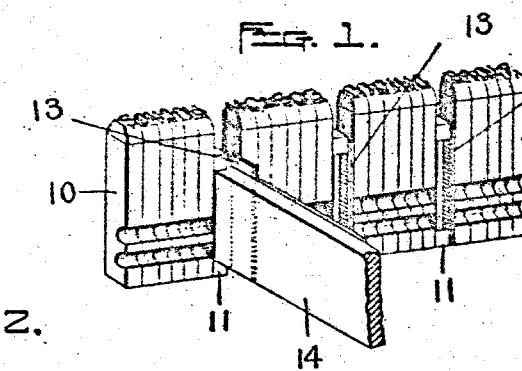
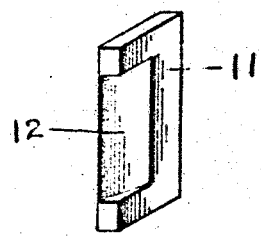
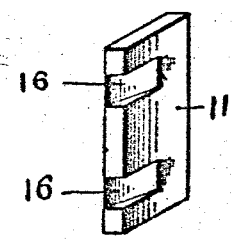
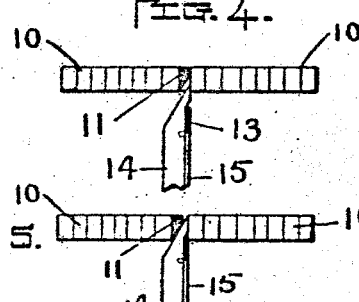
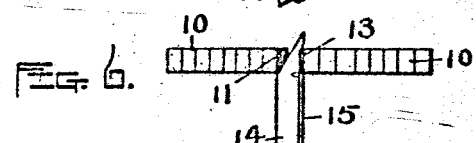
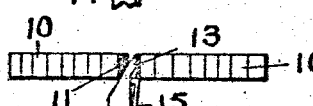
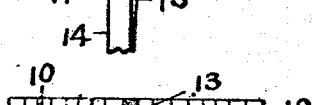
Witnesses,
E. Forrest Wesson.
M. E. Regan.
Inventor
CHARLES H. COCHRANE.
By Southgate & Southgate Attys No. 740,537. PATENTED OCT. 6, 1903.
C. H. COCHRANE.
TYPE SPACE AND MEANS COÖPERATING THEREWITH FOR JUSTIFYING
LINES OF TYPE.
APPLICATION FILED FEB. 1, 1900.
NO MODEL. 2 SHEETS—SHEET 2.
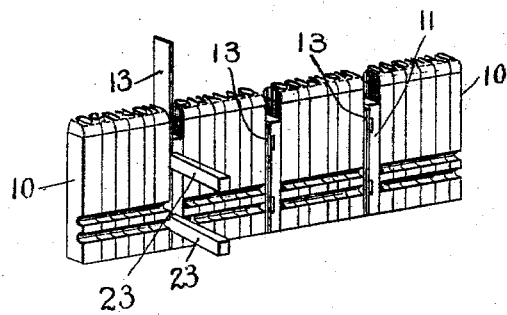
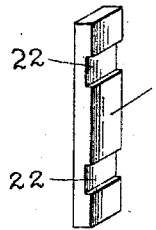 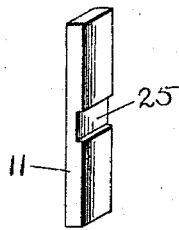 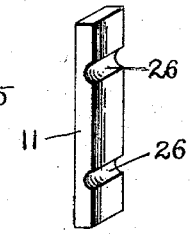 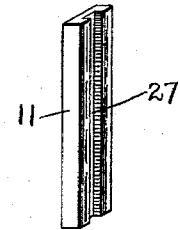 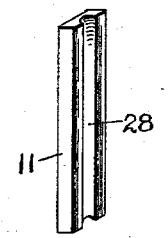
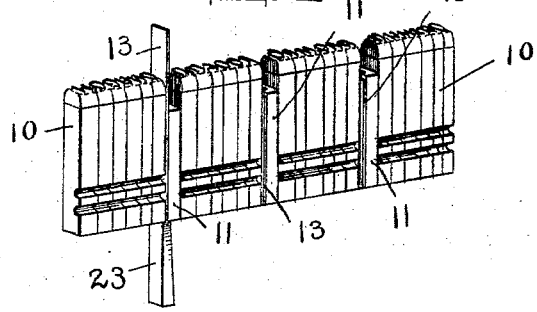
Witnesses,
B. Forrest Wesson.
M. E. Rogan.
Inventor;
Charles H. Cochrane.
By Southgate & Southgate Attys.

No. 740,537. Patented October 6, 1903.

UNITED STATES PATENT OFFICE.

CHARLES H. COCHRANE, OF NEW YORK, N. Y.

TYPE-SPACE AND MEANS COÖPERATING THEREWITH FOR JUSTIFYING LINES OF TYPE.

SPECIFICATION forming part of Letters Patent No. 740,537, dated October 6, 1903.

Application filed February 1, 1900. Serial No. 3,560. (No model.)

*To all whom it may concern:*

Be it known that I, CHARLES H. COCHRANE, a citizen of the United States, residing at New York, in the county of New York and State of New York, have invented new and useful Type-Spaces and Means Coöperating Therewith to Justify Lines of Type, of which the following is a specification.

The most difficult problem to-day in setting type is to justify the type-lines so that they will be of the same length.

Among various methods of justifying type it has been proposed to make the type-spaces compressible and compress the type-lines all to one length. It has been proposed to separate or spread apart the words by wedges. In other cases it has been proposed to provide automatic mechanism for withdrawing the type-spaces from the line of type and substituting different spaces therefor and continuing the operation until a line of type less than the desired length is brought to proper length. It has also been proposed to provide a mechanism which will automatically separate the words, so that additional spaces can be dropped in to fill out the line. These proposed methods have met with comparatively little commercial success, and it is still the common practice in setting type to justify the type by hand by selecting and varying the type-spaces until the right length is obtained.

The especial object of my present invention is to provide an improvement in justifying type which will facilitate and cheapen the present methods of justification and which will be equally applicable to the justification of a line of matrices as to a line of ordinary printing-type. In speaking of a "type unit," therefore, in this specification I intend to include either an ordinary printing-type having a letter or other character in relief thereon, a matrix having a character formed intaglio therein, slugs, logotypes, or compound types, which are sometimes formed with a plurality of characters either in relief or intaglio, and the spaces which are less than type high and are used to separate successive words either in lines of type or lines of matrices.

As distinguished from prior methods of justifying type, my present invention is designed to facilitate the successive insertion of thin shims between successive type-spaces and the type units adjacent thereto to bring the line of type to the desired length.

In practicing my invention the line of type or matrices is set up in the ordinary manner by the compositor or by machine; and the feature of novelty of my invention consists in using type units (preferably the spaces) which have recesses in the faces thereof which abut against adjacent type units, which recesses are designed to receive the point of a spreading-tool for opening the line. The line as set up by the compositor or by machine is less than the proper length, but approximates the proper length as closely as convenient. To justify the line as thus set up, a spreading-tool is employed for opening the line to receive thin justifying-shims. The justifying-shims are inserted progressively from one space to a succeeding space until the line is brought to the proper length, and in as much as the justifying-shims may be made very thin a very accurate and even justification of the line can be secured.

In the accompanying drawings, Figure 1 is a perspective view of a line of type, illustrating the manner in which the same is justified according to this invention. Fig. 2 is a perspective view of the novel form of space which I preferably employ. Fig. 3 is a similar view showing a modified form of space having two transverse recesses in the face thereof. Figs. 4 to 8 are diagrammatic views illustrating successive steps in justifying a line of type according to this invention, in which figures Fig. 4 shows the commencement of the justifying operation. Fig. 5 shows the spreading-tool partly inserted into the line. Fig. 6 shows the spreading-tool completely inserted, so as to bring a justifying-shim into place. Fig. 7 shows the spreading-tool partially withdrawn. Fig. 8 shows the completion of the operation of inserting a justifying-shim into the line according to this invention. Fig. 9 illustrates the insertion of justifying-shims by dropping the same into place rather than by having them carried into position by the spreading-tool. Figs. 10 to 14, inclusive, illustrate modified forms of type-spaces constructed according to this invention, and Fig. 15 illustrates the manner in which the spreading-tool is inserted from the bottom of the line when longitudinal recessed type-spaces are employed.

As shown in Fig. 1, 10 designates types set up into a line. In the particular line chosen for illustration ordinary printing-types are illustrated set up to form four words. Between the words are type-spaces 11 less than type high, having recesses in the faces thereof which abut against adjacent type units. The preferred form of type-space which is employed is illustrated in Fig. 2 and has a single transverse tapering recess 12 in the face thereof. To adjust the line of type, a two-part spreading-tool is preferably employed for inserting justifying-shims into the line. The justifying-shims 13 are preferably made of a harder metal than type-metal—such as brass, steel, or the like—and the lines are preferably justified by starting at one space and proceeding progressively along the line from one space to the next, repeating the operation, if necessary, until the type-line is brought to the desired length.

In Fig. 1 a shim 13 is shown as being inserted between the first type-space and the type unit adjacent thereto, and two shims are shown between each of the other type-spaces and the adjacent type units.

The operation of a two-part spreading-tool for opening the line of type and inserting justifying-shims therein is most clearly illustrated in Figs. 4 to 8, inclusive. As shown in these figures, the tool comprises a body portion 14, preferably though not necessarily having a wedge-shaped or sharpened point and a supplemental slide 15, secured on the side thereof.

In using a two-part tool for inserting the shims 13 the tool is moved forward as a whole to open the type-line and bring a justifying-shim into place therein, as illustrated in Fig. 6. The body portion of the tool is then withdrawn, while the slide of the tool is held stationary and is slightly sprung or separated from the body portion by means of a pin or tongue engaging a cam-groove in the face thereof, as illustrated in Figs. 7 and 8, thus holding the justifying-shim in place during the withdrawal of the tool, and this operation being repeated successively along the line until the line is brought to the desired length.

Instead of employing type-spaces each having a single transverse recess 12 I may employ type-spaces which may be differently notched or recessed. For example, as shown in Fig. 3, a type-space 11 may be provided with two or more notches or nicks 16 in the face thereof which abut against an adjacent type-space, and in using this form of type-space the tool would be provided with distinct prongs. Instead of employing type units which are provided with tapering recesses in their faces which abut against adjacent type units I may provide the type units with notches or recesses of uniform depth, and instead of employing the spreading-tool for inserting the justifying-shims into the line the justifying-shims may be put into place independently of the spreading-tool, such construction being illustrated in the second sheet of drawings.

As illustrated in Figs. 9 and 10, I may employ type-spaces 11, having transverse notches 22 of uniform depth, and I may employ spreading-tools 23 for simply opening the line of type, the justifying-shims 13 being dropped into place independently of the spreading-tool. In some cases also each type-space may have a single transverse recess 25, as shown in Fig. 11, or the recesses in the face thereof may be made semicylindrical, as shown at 26 in Fig. 12, or the type-space may have a longitudinal recess 27, as shown in Fig. 13, and such longitudinal recesses in the abutting faces of the type units may be semicylindrical, as illustrated at 28 in Fig. 14. When type units having longitudinal recesses, as 27 or 28, are employed, the spreading-tool may be inserted from the bottom of the line, as illustrated in Fig. 15.

Numerous changes may be made in the shapes and proportions of type units by those who are skilled in the art without departing from the scope of my invention as expressed in the claims, and while with a view of fully disclosing my invention I have described a method of justification by the insertion of thin shims or thin strips of material and have also described a special construction of tool for carrying out this invention it is to be understood that such features are not herein claimed specifically, the claims of this application for patent being intended, primarily, to cover a particular construction of type unit and various combinations of different type units which permit them to be justified in the manners described.

Having thus fully described my invention, what I claim as new, and desire to secure by Letters Patent of the United States, is—

1. As an article of manufacture, a type-space less than type high, having a tapering recess for receiving the point of a spreading-tool, which recess extends transversely into one face of said space, which is intended to abut against an adjacent type unit.

2. The combination of type units, and spaces less than type high, each having a recess in a face thereof which abuts against an adjacent type unit to receive the point of a spreading-tool for opening the line for the insertion of justifying-shims, substantially as described.

3. The combination of types, spaces less than type high, each having a recess for receiving the point of a spreading-tool, which recess is formed in a face of said space which abuts against an adjacent type, and shims which are inserted between the spaces and adjacent types.

In testimony whereof I have hereunto set my hand, in the presence of two subscribing witnesses.

CHARLES H. COCHRANE.

Witnesses:
GEORGE H. SONNEBORN,
BENJAMIN F. MEGIE.